Dec. 20, 1960    R. ALFAYA ET AL    2,965,432
APPARATUS FOR TRANSFORMATION FROM CONTOURS INTO PROFILES
Filed Dec. 29, 1954    4 Sheets-Sheet 1

INVENTORS.
RAYMOND ALFAYA
PETER B. ROLL
BY W.R. Maltby
Louis B. Applebaum
ATTORNEYS

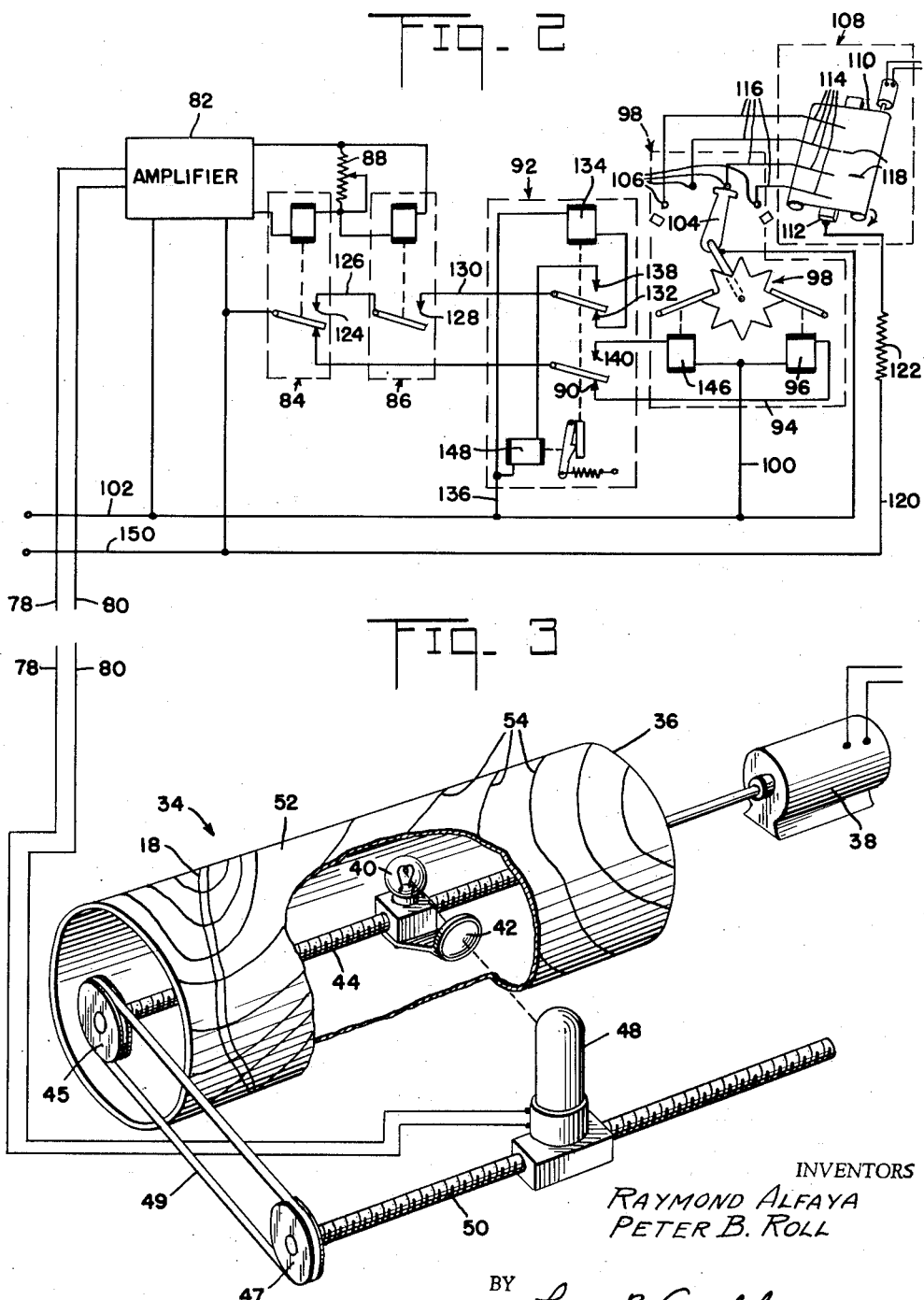

Dec. 20, 1960 R. ALFAYA ET AL 2,965,432
APPARATUS FOR TRANSFORMATION FROM CONTOURS INTO PROFILES
Filed Dec. 29, 1954 4 Sheets-Sheet 3

INVENTORS.
RAYMOND ALFAYA
PETER B. ROLL
BY
W.R. Maltby
Louis B. Applebaum
ATTORNEYS Dec. 20, 1960          R. ALFAYA ET AL          2,965,432
APPARATUS FOR TRANSFORMATION FROM CONTOURS INTO PROFILES
Filed Dec. 29, 1954                             4 Sheets-Sheet 4

INVENTORS.
RAYMOND ALFAYA
PETER B. ROLL
BY
ATTORNEYS

United States Patent Office 2,965,432
Patented Dec. 20, 1960

2,965,432

APPARATUS FOR TRANSFORMATION FROM CONTOURS INTO PROFILES

Raymond Alfaya, 9 Windsor Drive, South River, N.J., and Peter B. Roll, 393 Ryder Road, Manhasset, N.Y.

Filed Dec. 29, 1954, Ser. No. 478,554

1 Claim. (Cl. 346—35)

(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for converting topographic or other contour information into profile information. The recording of the profile information is in continuous form and the transformation is instantaneous.

The method and apparatus for recording the information is new and is particularly adapted to the automatic fabrication of terrain model masters from contour map information, and for the first time, complete mechanization of the process is practicable. Present methods are manual and require the use of skilled technicians, who cut a separate layer for each contour level in the construction of topographic relief models. As a result, with the necessity for a separate cutting operation for each contour layer, conventional methods are expensive and time consuming, as well as not readily capable of being mechanized.

In any contour map, the configuration of a surface is shown by means of contour lines representing predetermined, regular intervals of elevation. These intervals of elevation, or contour intervals may be selected, for example, with each interval being equal to ten feet of elevation, or each interval being equal to every twenty feet of elevation, or in any desired scale. The contour lines connect the points on the land surface that have the same elevation. Therefore, each continuous line represents a specific elevation. In any contour representation of a surface, there are a plurality of inflection locus lines. This latter information designates the reversals in maximum and minimum elevations of a contour map and is of great importance in carrying out the invention.

The primary object of the invention is to convert a map with a plan image of a three dimensional surface into a profile, or elevational, image of the surface.

Another important object of the invention is to provide an automatic system for converting the contour information into the profile image. This will obviate the necessity for using skilled technicians and will reduce the total time of conventional processes.

Another object of the invention is to reproduce the contour information as a series of lines from which the three dimensional surface is produced. This is accomplished by the use of density extremes against a neutral density background so that simple photographic equipment may be used.

A feature of the invention resides in the use of inflection locus lines to indicate whether a specific pair of successive contours designate a positive or a negative increment on the three-dimensional surface which the contours represent.

Another feature of the invention resides in the use of photoelectric scanning to provide an automatic transformation of contour lines into profile information, in the form of signals, which can then be recorded in continuous form.

Other objects and many of the attendant advantages of this invention will be readily appreciated as the same becomes better understood by reference to the following detailed description when considered in connection with the accompanying drawings wherein:

Fig. 2 is a schematic view of the invention showing the scanning unit and the operative circuit therefor.

Figures 1, 5:
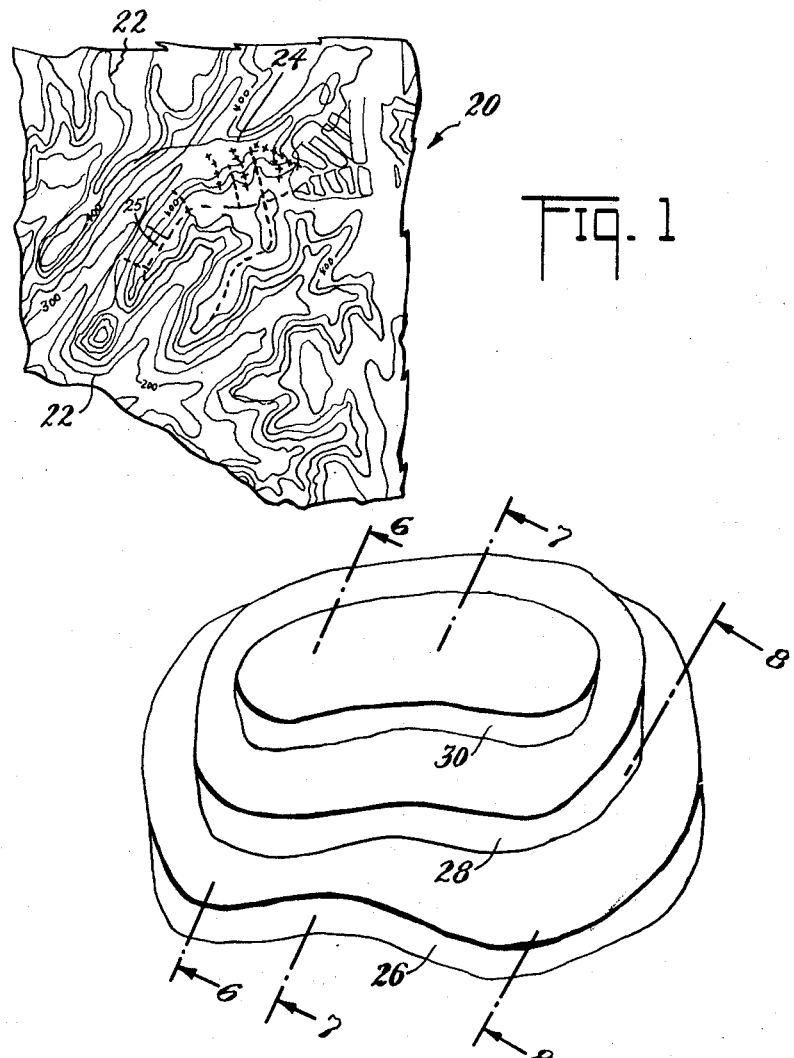
Fig. 1 illustrates a small section of a conventional contour map.
Figure 4:
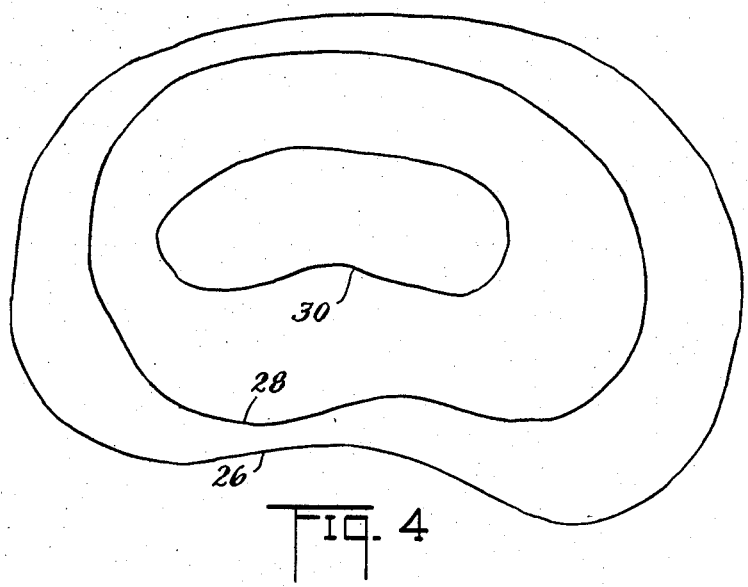
Figure 9:
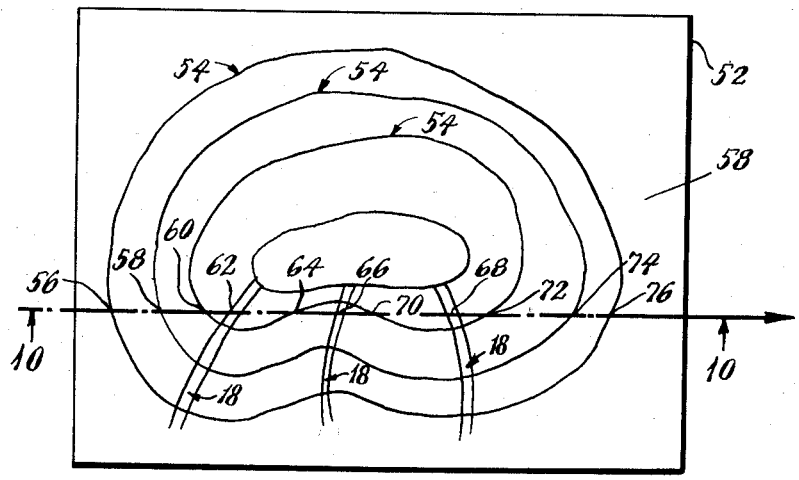
Figure 10:
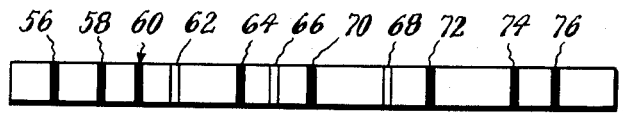
Figure 11:
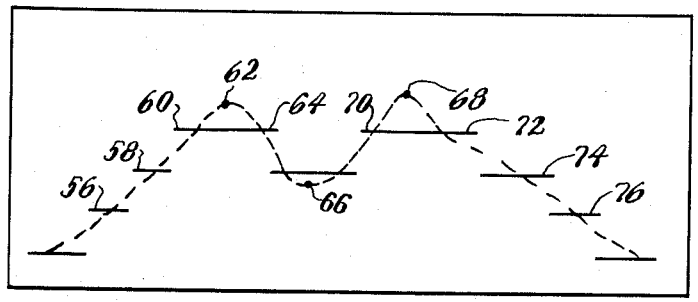

Fig. 3 is an enlarged perspective view of the scanning apparatus with a portion of the drum broken away to disclose the interior thereof, Fig. 4 is a plan view, or a contour representation, of a terrain surface, Fig. 5 is a perspective view of the terrain surface of Fig. 4, Figs. 6, 7 and 8 illustrate elevations of the surface of Figs. 3 and 4 and are taken on the lines 6—6, 7—7, and 8—8, respectively, on Fig. 5, Fig. 9 is a plan view of a contour map that has been especially prepared for scanning purposes, Fig. 10 is a section taken on the scanning line 10—10 of Fig. 9, and Fig. 11 represents a portion of the final profile record and illustrates the elevations and depressions of a contour map, together with the inflection locus lines.

The invention is especially adapted for use in the automatic fabrication of topographic relief models from standard contour maps. A contour map is a plan representation of a three dimensional terrain. Mathematically, any three dimensional terrain is a function of three variables. Since, if the earth's curvature is neglected, a terrain surface is bounded below by a horizontal plane, it is usual to represent such a surface, in two dimensions, by the traces of the surface on a series of planes parallel to the horizontal datum plane. Such a representation is a contour representation, and consists of a parametric family of curves in two variables. Further, this parametric family must be considered a multiple-valued function of two variables; for each value of the independent variable, there may be any number of values for the dependent variable. Fig. 1 is a section of a contour map 20 with contour lines at 22, at intervals of twenty-five feet each. Thus, a section taken across the map would demonstrate a rise or depression of twenty-five feet for each line crossed. Obviously, the closer the contour lines are to each other, the more rapid the elevation or depression, while spaced contour lines indicate a gradual rise in elevation and a more level terrain. Also, the greater the number of interval sections taken, the closer the terrain could be reproduced in three dimensions with a minimum of necessity to rely upon interpolation. And if the sections could be taken continuously, an accurate three dimensional reproduction would be the result. It is this latter procedure that the invention is designed to accomplish. Each contour surface representation contains inflection locus lines. These lines are defined as projections, in a plane parallel to the contours, of those space curves which comprise the loci of all maxima and minima on the surface. Cross lines 24 designate low points or depressions and broken lines 25 represent ridge lines or elevations.

In Figs. 4 to 8 are illustrated schematically the process whereby conversion from contour information to three-dimensional information is effected. In Fig. 4, the contour lines 26, 28 and 30 of any map are illustrated in the conventional plan arrangement. The same lines are pictorially shown in Fig. 5 as a perspective view. Sections taken at lines 6—6, 7—7, 8—8 are shown in profile form in the corresponding Figures 6, 7 and 8.

Figures 6, 7, 8:
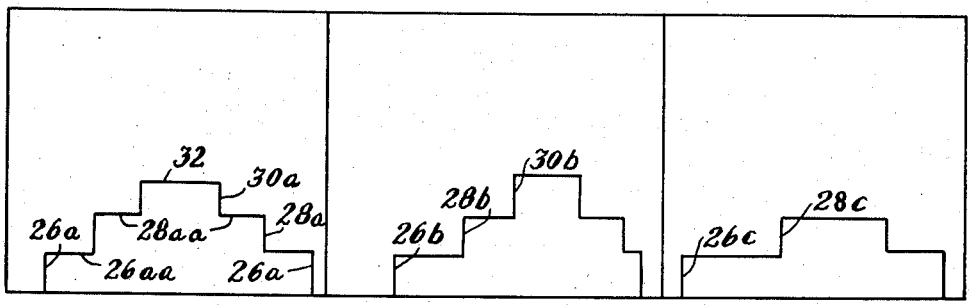

Thus, for example, in Fig. 6, lines 26a 28a and 30a represent the increment and decrement of that section of the contour map of Fig. 4. Horizontal lines 26aa, 28aa represent the area that is to be interpolated, while line 32 represents the locus of that section. This is also true for sections 26b, 28b, 30b and 26c, and 28c. It is thus apparent that by providing many more sections than the number illustrated, the profiles of Figs. 6 to 8 will be closer together and will require less interpolation. It will be appreciated that the conventional hand methods used are tedious and expensive. Instead, an automatic process to provide a continuous profile method has been devised, one form of which is shown in Figs. 2, 3 and 9 to 11.

A photoelectric scanner 34 is operative by means of an electronic control system, as will presently appear. As is best illustrated in Fig. 3, drum or cylinder 36 is transparent in construction and is rotated by means of a synchronous motor 38. Illuminating means comprising a light source 40 and condenser lens system 42 are mounted on lead screw 44 to move, by conventional means, uniformly along a direction parallel to the axis of the cylinder, when the cylinder is rotated. A photoelectric cell 48 is mounted on a similar lead screw 50, in spaced parallel relation to lead screw 44, outside cylinder 36. The lead screws 44 and 50 are mechanically coupled by means of pulleys 45 and 47 and belt 49 so that both photoelectric cell 48 and light source 40 advance together along their respective lead screws. Transparent film 52, containing map data such as is shown in Fig. 9, is wrapped around cylinder 36.

Film 52 includes a plurality of contour lines 54 generally represented by black lines. These black lines illustrate schematically a change in elevation at a preselected, constant distance. (Fig. 1 represents an actual contour map and shows in greater detail topographic information similar to Fig. 4.) In addition, a plurality of inflection locus lines 18, represented as clear lines against a neutral density, or gray, background 58 are shown. These inflection locus lines are projections, in a plane parallel to the contours, of those space curves which comprise the loci of all maxima and minima on the surface. The inflection locus lines thus depict the points where the curve changes its direction, either up or down.

The use of inflection locus lines is new and makes possible the use of a continuous method of providing the profiles necessary in the production of a three dimensional master terrain model.

As shown in the figures, at the instant a point on a given black contour-line image is scanned, the X and Y-coordinates of a corresponding point on a three-dimensional surface, which contours 54 represent, are uniquely determined by the angular position of the cylinder and by the position, along a line parallel to the cylinder, of lead-screw driven photoelectric pickup unit 48. Additionally, the scanning of a contour immediately subsequent to the given one denotes a change in Z-coordinate, or elevation, relative to the given contour. It is the function of the inflection locus lines to indicate whether this Z-coordinate increment is positive or negative.

The effects of scanning a plurality of contours and inflection locus lines is shown in Figs. 9 to 11. In scanning along line 10—10 in Fig. 9, the crossing of specific contours successively at 56, 58, 60, of the contour lines designated generally as 54, indicates a positive, or "uphill" Z-increment, as is illustrated by the horizontal lines in Fig. 11. During any scanning procedure across a section of a map, there will be ridges and valleys, since few terrains are flat. Thus, in scanning along line 10—10, one or more peaks, as well as depressions, may be found. These are the loci points, and it is apparent that inflection locus lines 56 represent the peak increments at 62 and 68, after which there is a change in direction. Locus line 66 represents the maximum decrement or "downhill" Z-increment, after which there must be an upward change in direction of the terrain.

Inspection of Figs. 9 to 11 therefore discloses that scanning along line 10—10 indicates an elevation or Z-increment at 56, 58 and 60, with a change of direction at locus line 62. The decrement changes again to an increment in elevation at 66. This increment increases at 70 and is again reversed at 68, the "downhill" Z-increments being indicated when the contours at 72, 74 and 76 are scanned. When these profile lines are interpolated (by well-known procedures forming no part of this invention), the terrain profile shown in Fig. 11 in dotted lines, is obtained.

This procedure is carried out by the photoelectric scanning means illustrated in Figs. 2 and 3, where a film with black contour lines and clear inflection locus lines against a neutral gray background, permits the selective generation of either of two classes of signal, in addition to a no-signal. Selection of colors may be substituted, if desired.

As shown in Fig. 2, the photoelectric current generated by scanner 34 is fed through leads 78 and 80 to an amplifier 82. Amplified signals are fed to two sensitive relays 84 and 86. The coils of relays 84 and 86 are connected in series. Variable resistance 88, connected in parallel with the operating coil of relay 86, can be so adjusted that more current is required to operate relay 86 than is required to operate relay 84. The output of amplifier 82 can then be adjusted so that when a black contour-line is scanned, the coils of both sensitive relays 84 and 86 remain de-energized. Also, when any point on the neutral gray background is scanned, only the coil of sensitive relay 84 is energized. And when a clear inflection locus line is scanned, the coils of both sensitive relays 84 and 86 are energized.

Before each rotation of the drum, moving contact 104 of stepping switch 98 is set on the fixed contact 116 representative of the proper elevation at the edge of the map, and latching relay 92 is set to provide "uphill" or "downhill" stepping of switch 98 as appropriate to the grade at the starting point.

When a black contour line is scanned, 110 v. line current from lead 150 flows through a pair of normally closed contacts 90 of a latching relay 92, through lead 94, to energize clock-wise stepping coil 96 of stepping relay 98, and then through leads 100 and 102, to complete the circuit. When the stepping relay is thus energized, the rotary switch type moving contact 104 is stepped, in a clockwise direction, from one of a plurality of fixed contacts 106, to the next adjacent fixed contact.

The switching action provided by contacts 104 and 106 of the stepping relay 98 is utilized in connection with the recording unit, generally identified at 108. The recording units consists of a means to advance an electro-sensitive paper 110, a smooth metal electrode plate 112 positioned in contact with the bottom of paper 110, and a number of pointed conductive styli 114 connected by suitable leads 116 to the fixed contacts of stepping relay 98. When marking current is applied to the moving strip of electro-sensitive paper, through one of styli 114, a black line 118 is made on the paper. Marking current is provided by having line current fed through leads 150 and 120, through a current control resistance 122 to electrode plate 112, through electro-sensitive paper 110, through one stylus 114, then through one of leads 116 to one of the fixed contacts 106, through the moving contact 104 of stepping relay 98 and then through leads 100 and 102 to complete the circuit.

It is thus apparent that the function of stepping relay 98 is to switch the marking current from one stylus 114 to an adjacent stylus, producing on electro-sensitive paper 110, a series of black lines as indicated at 118. These lines comprise a continuous profile record as illustrated in Fig. 11.

From Fig. 2 it is apparent that when any point on the neutral gray background is being scanned, the line current circuit from lead 150, through the normally open contacts 124 of sensitive relay 84, and then through lead line 126, is interrupted at the normally open contacts 128 of sensitive relay 86. Therefore, no stepping relay action takes place during scanning of the neutral gray background, and once the paper marking current has been switched to one stylus 114, that stylus will continue to trace a black line, as seen at 118, until the scanning of the next successive contour changes the marking current to an adjacent stylus. Under these conditions, the successive scanning of contours will continue to produce a clock-wise stepping of relay 98, such that the lines successively traced by the styli comprise a profile record which indicates "uphill" change in the Z-coordinate.

In order to effect a change in the direction of a Z-coordinate increment, an inflection locus line must be scanned. From Fig. 2, it is seen that the scanning of an inflection locus line causes the operating coils of both sensitive relays 84 and 86 to be energized. Then, line current from lead 150 flows through normally open contacts 124 of relay 84, through line 126 to normally open contacts 128 of relay 86. From 86, current flows through lead 130, through normally closed contacts 132 of latching relay 92, thereby energizing operating coil 134 of relay 92, and through leads 136 and 102 to complete the circuit. Because of the latching feature of relay 92, both sets of contacts 132 and 138 and 140 and 90 are held in the "energized" position indefinitely, once the operating coil has been briefly energized, as described above, by the scanning of an inflection locus line.

With the latching relay 92 thus held in the "energized" position, the scanning of a contour, subsequent to the scanning of an inflection locus line causes the line current, which is fed into lead 142 from relay 84, to flow through normally open contacts 140 of relay 92, through lead 144, to energize counter-clockwise stepping coil 146 of stepping relay 98. Thus, after scanning an inflection locus line, as each successive contour line is crossed, the counter-clockwise stepping action of relay 98 will switch marking current from one stylus 114 to an adjacent stylus, so that the corresponding lines traced by styli 114 on the electro-sensitive paper comprise a profile record.

It is apparent, therefore, that latching relay 92 will be held in the "energized" position until such time as another inflection locus line is scanned. Again, this will cause sensitive relays 84 and 86 to be energized, and the line current from lead 150 to be switched, by means of sensitive relays 84 and 86, to lead 130. With latching relay 92 in "energized" position, current from lead 130 flows through normally open contacts 138 of relay 92 and energizes release coil 148 to flow through leads 136 and 102 to complete the circuit.

Thus it is clear that the scanning of a contour line causes stepping relay 98 to switch marking current from one stylus 114 to an adjacent stylus, by energizing either the clock-wise stepping coil 96 or the counter clock-wise stepping coil 146. The scanning of an inflection locus line operates the latching relay 92 in order to select the appropriate stepping relay coil 96 or 146, corresponding to the "uphill" or "downhill" change required for a particular sequence of contours.

While the drum cylinder represents one form of structure to carry out the invention, it is obvious many other structures may be used. For example, a flat-bed scanning system, rather than the cylindrical system, could be used.

Instead of the transmittance pick-up system described above, a reflection system could be used. In this case, the contour and inflection locus line information would be provided in the form of a photographic image on white opaque material, and the light source and photoelectric cell would be placed so that rays of light would be reflected from the photographic image and picked up by the photo-electric cell. Also, the electrical switching means of relays 84, 86, 92 and 98 could be replaced by electronic circuits using thyratrons or other electron tubes. While electro-sensitive paper was used by way of example, any continuous recording means, such as magnetic tape or wire, sound track film, punched paper tape, etc., may be used instead of unit 108.

Thus, a novel method of transforming contour information into profile data has been devised. This process is capable of being carried out by many means and represents the first automatic scanning process.

Obviously many modifications and variations of the present invention are possible in the light of the above teachings. It is therefore to be understood that within the scope of the appended claim the invention may be practiced otherwise than as specifically described.

What is claimed is:

A device for transforming contour information recorded on a two dimensional surface in the form of contour lines of a given density and inflection locus lines of a second given density, said surface having density intermediate the densities of said contour lines and inflection locus lines, comprising means for illuminating a small area of said surface, sensing means for detecting said illumination, said sensing means producing an output proportional to the level of illumination transmitted by said surface, means for synchronously moving said illuminating means and said sensing means relative to said surface to systematically scan said contour information, output level responsive means coupled to said sensing means comprising first and second relays, reversible stepping switch means having a plurality of output terminals, means for reversing the direction of said stepping switch means, said first relay being actuated by changes in the output of said sensing means caused by changes in transmitted illumination due to scanning of said contour lines to operate said stepping switch means, said second relay being actuated by changes in the output of said sensing means caused by changes in transmitted illumination due to scanning of said inflection locus lines to operate said direction reversing means, whereby the position of said stepping switch is indicative of the elevation profile of the contour information being scanned, and recording means connected to said output terminals for recording said profile information.

References Cited in the file of this patent

UNITED STATES PATENTS

| | | |
|---|---|---|
| 2,047,013 | Dorn | July 7, 1936 |
| 2,163,124 | Jeffreys et al. | June 20, 1939 |
| 2,283,226 | Porter | May 19, 1942 |
| 2,303,472 | Johnston | Dec. 1, 1942 |
| 2,397,559 | O'Brien | Apr. 2, 1946 |
| 2,463,534 | Hawkins | Mar. 8, 1949 |
| 2,569,510 | Wolf | Oct. 2, 1951 |
| 2,569,817 | Wolf | Oct. 2, 1951 |
| 2,577,814 | Saunderson | Dec. 11, 1951 |
| 2,679,636 | Hillyer | May 25, 1954 |